United States Patent
Liu et al.

(10) Patent No.: US 11,321,486 B2
(45) Date of Patent: May 3, 2022

(54) METHOD, APPARATUS, DEVICE, AND READABLE MEDIUM FOR IDENTIFYING PRIVATE DATA

(71) Applicant: Alipay (Hangzhou) Information Technology Co., Ltd., Zhejiang (CN)

(72) Inventors: Jiawei Liu, Zhejiang (CN); Peng Zhang, Zhejiang (CN); Desheng Wang, Zhejiang (CN); Xi Jia, Zhejiang (CN); Yang Liu, Zhejiang (CN); Qian Zhang, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/360,425

(22) Filed: Jun. 28, 2021

(65) Prior Publication Data
US 2022/0027505 A1    Jan. 27, 2022

(30) Foreign Application Priority Data
Jul. 21, 2020    (CN) .......................... 202010706285.6

(51) Int. Cl.
*G06F 21/62*    (2013.01)
*G06K 9/62*    (2022.01)
(Continued)

(52) U.S. Cl.
CPC .... *G06F 21/6245* (2013.01); *G06F 16/90344* (2019.01); *G06K 9/6215* (2013.01); *G06N 20/00* (2019.01)

(58) Field of Classification Search
CPC ............... G06N 20/00; G06F 21/6245; G06F 16/90344; G06K 9/6215
(Continued)

(56) References Cited

U.S. PATENT DOCUMENTS 8,930,295 B2 *    1/2015    Campbell .............. G06Q 40/00
                                                        706/46
9,596,083 B2 *    3/2017    Yasuda ................. H04L 9/3093
(Continued)

FOREIGN PATENT DOCUMENTS

CN    108537056 A    9/2018
CN    111046422 A    4/2020

OTHER PUBLICATIONS

NPL Search Terms (Year: 2021).*
NPL Search Terms (Year: 2022).*

*Primary Examiner* — Syed A Zaidi
(74) *Attorney, Agent, or Firm* — Seed IP Law Group LLP

(57)    ABSTRACT

Implementations of the present specification disclose a method, apparatus, device, and a readable medium for identifying private data. A solution includes: obtaining a first length distribution vector and first character distribution statistical information of a first data set, the first data set being a set of private data samples; obtaining a second length distribution vector and second character distribution statistical information of a second data set, the second data set being a set of at least a part of data samples corresponding to a to-be-identified field; calculating a length distribution similarity and a character distribution similarity between the first data set and the second data set, and determining whether data corresponding to the to-be-identified field is private data of a same type as the first data set based on the length distribution similarity and the character distribution similarity.

27 Claims, 4 Drawing Sheets

(51) Int. Cl.
*G06N 20/00* (2019.01)
*G06F 16/903* (2019.01)

(58) Field of Classification Search
USPC .......................................................... 726/26
See application file for complete search history.

(56) References Cited

U.S. PATENT DOCUMENTS

| | | | | |
|---|---|---|---|---|
| 9,710,631 | B2* | 7/2017 | Bringer | G06F 21/32 |
| 2004/0193414 | A1* | 9/2004 | Calistri-Yeh | G06F 16/36 |
| | | | | 704/245 |
| 2005/0286753 | A1* | 12/2005 | Ho | H04N 17/04 |
| | | | | 382/141 |
| 2006/0101060 | A1* | 5/2006 | Li | G06F 16/583 |
| 2009/0285490 | A1* | 11/2009 | Hotta | G06K 9/6255 |
| | | | | 382/195 |
| 2010/0104192 | A1* | 4/2010 | Katsuyama | G06K 9/627 |
| | | | | 382/190 |
| 2012/0234554 | A1* | 9/2012 | Kumaran | G01V 1/325 |
| | | | | 166/369 |
| 2014/0195498 | A1* | 7/2014 | Asher | H03M 7/607 |
| | | | | 707/693 |
| 2015/0193431 | A1* | 7/2015 | Stoytchev | G16B 30/00 |
| | | | | 704/9 |

* cited by examiner

METHOD, APPARATUS, DEVICE, AND READABLE MEDIUM FOR IDENTIFYING PRIVATE DATA

BACKGROUND

Technical Field

The present application relates to the field of computer technologies, and in particular, to a method, apparatus, device, and a computer readable medium for identifying private data.

Description of the Related Art

In the existing technologies, when data of a target type is to be identified, an embedded rule corresponding to the type can be generally used for the identification, and the embedded rule can be a specific regular expression or a pre-trained multi-classification model. However, because these pre-prepared or pre-trained embedded rules cannot cover all data types, target data cannot be identified when the data that users want to identify does not have a corresponding pre-determined embedded rule.

Therefore, a target data identification method that can adapt to user demand and that has a broad application scope needs to be provided.

BRIEF SUMMARY

Implementations of the present specification provide a method, apparatus, device, and a computer readable medium for identifying private data that can adapt to user demand and that has a broad application scope.

The implementations of the present specification are provided as follows.

Implementations of the present specification provide a method for identifying private data, including: obtaining first statistic information of a first data set, the first data set being a set of private data samples, and the first statistic information including a first length distribution vector and first character distribution statistical information of the first data set; obtaining second statistic information of a second data set, the second data set being a set of at least a part of data samples corresponding to a to-be-identified field, and the second statistic information including a second length distribution vector and second character distribution statistical information of the second data set; determining a length distribution similarity between the first data set and the second data set based on the first length distribution vector and the second length distribution vector; determining a character distribution similarity between the first data set and the second data set based on the first character distribution statistical information and the second character distribution statistical information in response to determining that the length distribution similarity meets a first predetermined condition; and determining data corresponding to the to-be-identified field as private data of a same type as the first data set in response to determining that the character distribution similarity meets a second predetermined condition.

Implementations of the present specification provide an apparatus for identifying private data, including: a first acquisition module, configured to obtain first statistic information of a first data set, the first data set being a set of private data samples, and the first statistic information including a first length distribution vector and first character distribution statistical information of the first data set; a second acquisition module, configured to obtain second statistic information of a second data set, the second data set being a set of at least a part of data samples corresponding to a to-be-identified field, and the second statistic information including a second length distribution vector and second character distribution statistical information of the second data set; a length distribution similarity determining module, configured to determine a length distribution similarity between the first data set and the second data set based on the first length distribution vector and the second length distribution vector; a character distribution similarity determining module, configured to determine a character distribution similarity between the first data set and the second data set based on the first character distribution statistical information and the second character distribution statistical information in response to determining that the length distribution similarity meets a first predetermined condition; and a private data determining module, configured to determine data corresponding to the to-be-identified field as private data of a same type as the first data set in response to determining that the character distribution similarity meets a second predetermined condition.

Implementations of the present specification provide a device for identifying private data, including: at least one processor, and a memory communicatively connected to the at least one processor, the memory storing an instruction that can be executed by the at least one processor, and the instruction being executed by the at least one processor to enable the at least one processor to: obtain first statistic information of a first data set, the first data set being a set of private data samples, and the first statistic information including a first length distribution vector and first character distribution statistical information of the first data set; obtain second statistic information of a second data set, the second data set being a set of at least a part of data samples corresponding to a to-be-identified field, and the second statistic information including a second length distribution vector and second character distribution statistical information of the second data set; determine a length distribution similarity between the first data set and the second data set based on the first length distribution vector and the second length distribution vector; determine a character distribution similarity between the first data set and the second data set based on the first character distribution statistical information and the second character distribution statistical information in response to determining that the character distribution similarity meets a second predetermined condition; and determine data corresponding to the to-be-identified field as private data of a same type as the first data set in response to determining that the character distribution similarity meets a second predetermined condition.

Implementations of the present specification provide a computer readable medium storing a computer readable instruction, the computer readable instruction being executed by a processor to implement a method for identifying private data.

Implementations of the present specification can at least achieve the following beneficial effects: the first statistic information of the first data set of a specified private data type and the second statistic information of the second data set corresponding to the to-be-identified field are obtained, and whether the data corresponding to the to-be-identified field is data of the specified private data type can be determined by determining a data statistical information similarity between the first statistic information and the second statistic information. In this solution, because private data is identified based on statistical information, and data does not need to be pre-labeled, less human resource and computer resource are consumed. In addition, because private data of a same type can be identified based on specified private data, a private data type that can be identified is not limited to a private type corresponding to a predetermined rule, a broader scope of application can be achieved.

BRIEF DESCRIPTION OF THE SEVERAL VIEWS OF THE DRAWINGS

To describe the technical solutions in the implementations of the present specification or in the existing technologies more clearly, the following briefly describes accompanying drawings required for describing the implementations or the existing technologies. Clearly, the accompanying drawings in the following description show merely some implementations of the present application, and a person of ordinary skill in the art can still derive other accompanying drawings from these accompanying drawings without making innovative efforts.

DETAILED DESCRIPTION

Figure 1:
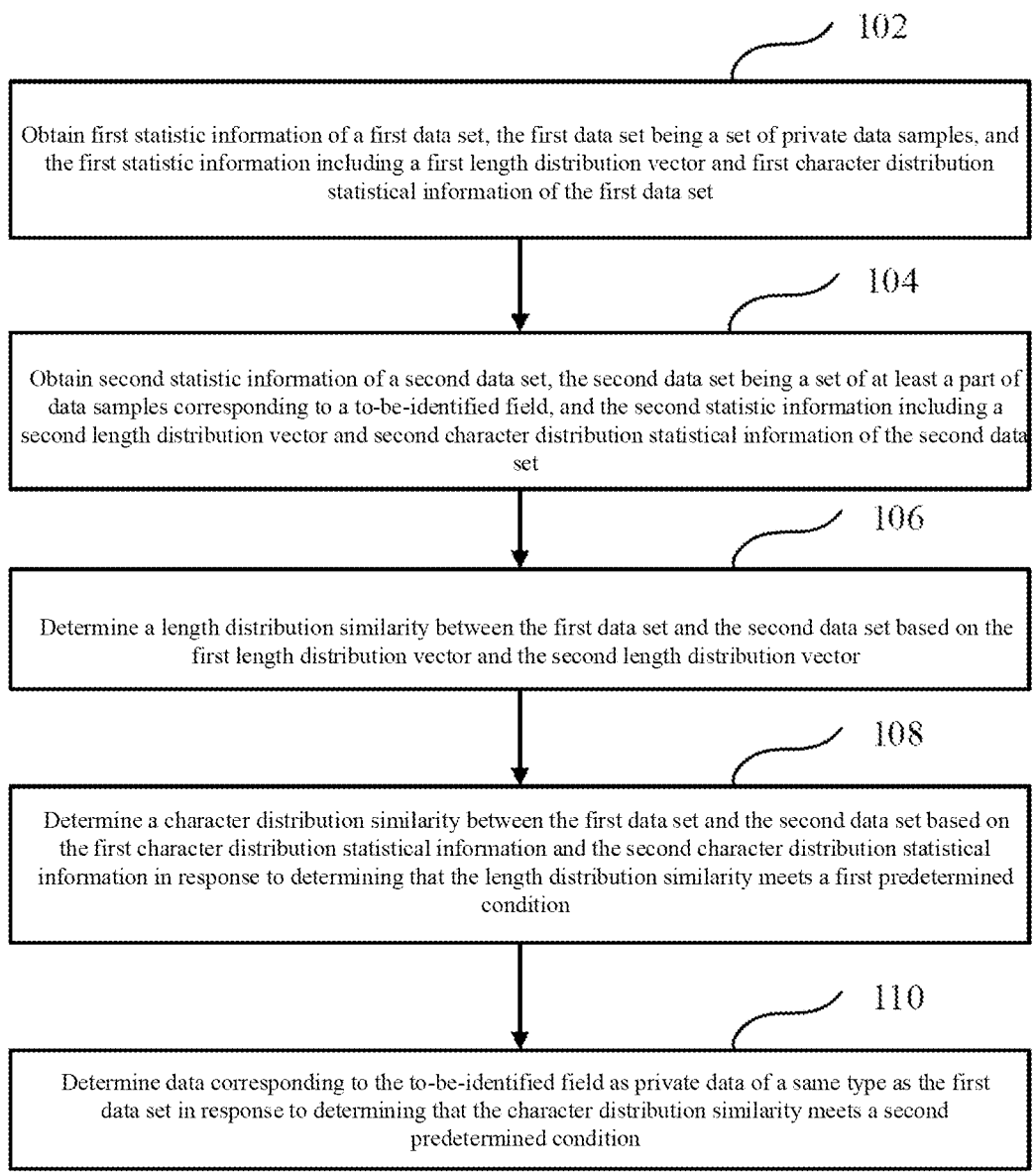
FIG. 1 is a schematic flowchart illustrating a method for identifying private data according to some implementations of the present specification.

Currently, when identifying private data, a user can use a corresponding predetermined regular expression or a corresponding pre-trained multi-classification model to identify the private data based on a type of the private data that the user wants to identify.

A regular expression constructs, based on an agreed syntax rule, a single character string to describe and match a series of character strings that conform to a certain syntax rule. For example, a mobile phone number can be represented by using a regular expression "^1[3-9][0-9]{9}$", and a field that matches this regular expression can be identified as a mobile phone number field. Currently, if a rule-based private data identification solution is used, when a database is scanned, each regular expression is used to determine a private data type for sampled data of the database, identification results of all sampled data are summarized, and final determining is performed. Because each rule is needed to achieve a determining effect, matching efficiency is very low when there are many private data types. In addition, because embedded rules cannot cover all private data types, an application scope is very limited. User demand cannot be met when there is no corresponding predetermined rule for a private type that the user wants to identify. Furthermore, writing of the embedded rule requires participation of professionals, and human resource is greatly consumed.

A method for identifying private data based on a multi-classification model is one of supervised learning methods. A pre-labeled private data type is used to learn the multi-classification model by using a machine learning algorithm or a deep learning algorithm. For data that needs to be detected, the multi-classification model is used to output a type with a largest posterior probability as a private data type of to-be-identified data. In a deep learning-based multi-classification method, data needs to be pre-labeled, leading to consumption of labor costs. Moreover, training of the multi-classification model needs to consume more GPU or CPU resources.

All private data identification solutions in the existing technologies are passive identification solutions. That is, private data identification mainly relies on an embedded rule (such as a regular expression rule and a multi-classification model) of a system. When a user uses a passive identification service, the user can only select a private data type covered by the embedded rule for processing. Consequently, the embedded rule cannot cover user demand.

Implementations of the present application provide a solution for actively identifying private data. Active identification can mean that a user can identify private data without pre-training and providing an identification model (such as a regular expression rule, a multi-classification model, or a prediction model) for identifying private data of a certain type. The user can be a person who wants to identify the private data. A main work process of actively identifying private data includes: a user actively specifies some data in a database as private data, and an algorithm or a model can obtain a certain mode through learning based on the given data, and select data that is similar or the same as the specified data mode from the database, so as to facilitate targeted encryption processing and protect the private data from being leaked.

An unsupervised learning method is used in the implementations of the present application, and a training sample does not need to be pre-labeled. Input data can be classified or grouped automatically by using a statistical method. Therefore, dependence on resources is relatively low, complexity is relatively low, efficiency is high, and a real-time performance is expected to be implemented. The solution in the implementations of the present application is an unsupervised solution because there is no dependence on labelling, can be applied to both passive identification and active identification, and has a broad application scope.

To make purposes, technical solutions and advantages of one or more implementations of the present specification clearer, the following clearly and fully describes the technical solutions in the one or more implementations of the present specification with reference to the implementations of the present specification and corresponding accompanying drawings. Clearly, the described implementations are merely some but not all of the implementations of the present specification. Based on the implementations of the present specification, all other implementations derived by a person of ordinary skill in the art without making innovative efforts shall fall within the protection scope of the one or more implementations of the present specification.

It should be understood that although the terms first, second, third, and the like may be used to describe various kinds of information in the present specification, such information should not be limited to these terms. These terms are used only to differentiate information of a same type.

The following describes in detail the technical solutions provided in the implementations of the present specification with reference to the accompanying drawings.

FIG. 1 is a schematic flowchart illustrating a method for identifying private data according to some implementations of the present specification. From the perspective of a program, the process can be executed by a program that is loaded on an application server or an application terminal.

As shown in FIG. 1, the process can include the following steps.

Step 102: Obtain first statistic information of a first data set, the first data set being a set of private data samples, and the first statistic information including a first length distribution vector and first character distribution statistical information of the first data set.

In the implementations of the present application, the set of private data samples can be referred to as the first data set. In practice, the private data samples can be selected data. In a subsequent step, data similar to the selected data can be determined based on statistical information. For example, private data of a same private type as the selected private data samples can be determined from a database.

Statistic information of the first data set can be referred to as the first statistic information.

The statistic information can include a length distribution vector used to represent length distribution statistics of data samples in a data set, and a length distribution vector of the first data set is referred to as the first length distribution vector. Values in the length distribution vector can represent numbers of data samples of different lengths in the data set.

The statistic information can further include character distribution statistical information used to represent character distribution statistics of the data samples in the data set, and character distribution statistical information of the first data set is referred to as the first character distribution statistical information. The character distribution statistical information can include a plurality of character distribution vectors, where the number of the character distribution vectors corresponds to a sample length of the data set. For example, if the sample length of the data set is N (N is a positive integer), the character distribution statistical information of the data set includes N character distribution vectors. For a character distribution vector corresponding to a length position, values in the character distribution vector can represent statistics of predetermined characters that are of all data samples in the data set and that appear at the length position. The predetermined characters can be characters in a predetermined character list.

In the implementations of the present application, a specific type of the private data is not specifically limited, and data that a user wants to identify and protect can be referred to as the private data. For example, the private data can include personal characteristic information (such as a telephone number, an address, and a credit card number), sensitive information (such as a personal health status, financial information, and an important company file), etc., used to locate or identify an individual, or can include family private data (such as a family annual income), corporate private data, etc.

The private data can include personal basic information, personal identity information, personal biometric identification information, network identity information, personal health physiological information, personal education and job information, personal property information, personal communication information, contact information, a personal Internet access record, personal commonly-used device information, personal location information, etc.

Private data of a personal basic information type can include specific private types such as a personal name, a birth date, a gender, an ethnicity, a nationality, a family relationship, an address, a personal telephone number, and an email. Private data of a personal identity information type can include specific private types such as an identity card, a military ID card, a passport, a driver's license, an employee card, a pass, a social security card, and a residence permit. Private data of a personal biometric identification information type can include specific private types such as a personal gene, a fingerprint, a voice print, sclera, a palm print, an auricle, an iris, and a facial feature. Private data of a network identity information type can include specific private types such as a system account number, an IP address, an email address and password, an access code, an access code protection answer, and a personal digital certificate that are related thereto. Private data of a personal health and physiological information type can include specific private types such as a relevant record generated by an individual due to illness and medical treatment, such as a disease, an inpatient medical record, a medical order, an examination report, a surgery and anesthesia record, a nursing record, a medication record, drug and food allergy information, fertility information, a past medical history, diagnosis and treatment, a family medical history, a current medical history, and a contagious disease history; other information related to the personal health status; and a weight, a height, and a vital capacity. Private data of a personal education and job information type can include specific privacy types such as a personal occupation, a position, a work unit, an education background, a degree, an education experience, a work experience, a training record, and an academic card. Private data of a personal property information type can include specific private types such as a bank account number, authentication information (access code), deposit information (including an amount of funds, a payment and receipt record, etc.), house property information, a credit record, credit information, a transaction and consumption record, a statement, and virtual property information such as a virtual currency, a virtual transaction, and a game redemption code. Private data of a personal communication information type can include specific private types such as a communication record and communication content, an SMS message, a multimedia message, an email, and data (commonly referred to as metadata) describing personal communication. Private data of a contact information type can include specific private types such as an address book, a buddy list, a group list, and an email address list. Private data of a personal Internet access record type can be an operation record stored by using a log, and can include specific private types such as a website browsing record, a software use record, and a click record. Private data of a personal commonly-used device information type can be information used to describe a basic situation of a personal commonly-used device, and can include specific private types such as a hardware serial number, a device media access control (MAC) address, a software list, and a unique device identifier (such as IMEI/Android ID/IDFA/OPENU-DID/GUID or SIM card IMSI information). Private data of a personal location information type can include specific private types such as a track, precise positioning information, accommodation information, and latitude and longitude. In addition, the private data can further include specific private types such as a marriage history, a religious belief, a sexual orientation, and an undisclosed criminal record.

The information listed above is merely an example of identifiable private data in the implementations of the present application, and is not limited to the above example.

Step 104: Obtain second statistic information of a second data set, the second data set being a set of at least a part of data samples corresponding to a to-be-identified field, and the second statistic information including a second length distribution vector and second character distribution statistical information of the second data set.

In the implementations of the present application, a set of to-be-identified data samples can be referred to as the second data set. For example, the set of the at least a part of data samples corresponding to the to-be-identified field in a database can be referred to as the second data set. A field can refer to a table field in the database. Statistic information of the second data set can be referred to as the second statistic information. The statistic information can include a length distribution vector and character distribution statistical information, a length distribution vector of the second data set is referred to as the second length distribution vector, and character distribution statistical information of the second data set is referred to as the second character distribution statistical information.

In some implementations, when whether a target field is a private field is identified, the target field can be identified based on at least a part of data corresponding to the target field. In practice, data not less than a predetermined number in data corresponding to the target field can be obtained, or data not less than a predetermined proportion in data corresponding to the target field can be obtained. In some embodiments, a plurality of pieces of obtained data can also simultaneously meet the condition of being not less than the predetermined number and not less than the predetermined proportion. A number of identified samples is set to meet the condition of being not less than one or more of the predetermined number or the predetermined proportion, so that accuracy of a result of determining, based on these samples, whether the target field contains private data can be further improved.

Step 106: Determine a length distribution similarity between the first data set and the second data set based on the first length distribution vector and the second length distribution vector.

In at least one implementation of the present application, assume that data of a same data type is similar in length distribution. Therefore, whether the second data set is data of a same type as the first data set can be determined based on similarity between the length distribution vector of the second data set and the length distribution vector of the first data set.

In practice, considering sample length distribution information before character distribution similarity is calculated is highly fault tolerant. Even if a noise sample occurs in the first data set, the data identification solution can have sufficient robustness. In addition, for the second data set with length distribution information inconsistent with that of the first data set, there is no need to subsequently identify character distribution statistical information, and this is equivalent to rough screening, thereby improving efficiency of private data identification and saving computing resources.

Step 108: Determine a character distribution similarity between the first data set and the second data set based on the first character distribution statistical information and the second character distribution statistical information in response to determining that the length distribution similarity meets a first predetermined condition.

In at least one implementation of the present application, assume that data of a same data type is similar in character distribution. Therefore, whether the second data set is data of a same type as the first data set can be determined based on similarity between the character distribution statistical information of the second data set and the character distribution statistical information of the first data set.

In practice, in a process of identifying private data based on statistic information, because character information of data samples at each position is considered, considered details are more diversified, and this is equivalent to performing fine screening on an identification result, so that identification accuracy is higher.

Step 110: Determine data corresponding to the to-be-identified field as private data of a same type as the first data set in response to determining that the character distribution similarity meets a second predetermined condition.

For example, when data in the first data set is a set of data samples of a specified private type, the data corresponding to the to-be-identified field can be determined as the data of the specified private type in step 110.

It should be understood that an order of some steps in the method described in one or more implementations of the present specification can be adjusted based on an actual need, or some steps can be omitted.

In the method in FIG. 1, based on the assumption that a same type of data should be similar in the length distribution and the character distribution, a similarity between length distribution statistic information of a known private data set and length distribution statistic information of a to-be-identified data set and a similarity between character distribution statistic information of the known private data set and character distribution statistic information of the to-be-identified data set are calculated to determine whether data in the to-be-identified data set is private data.

The solution in the implementations of the present application is an unsupervised identification solution. Identification is performed based on statistical information of samples without a large amount of manual labeling, and dependence on computing resources is low. Moreover, quasi real-time identification can be implemented due to low complexity, a small calculation amount, and high efficiency.

Main logic of at least one implementation of the present application is as follows: length distribution information of a data set and character distribution information at each position are extracted to identify private data, so that a data statistic feature can be pre-extracted and used based on a passive identification process, or can be nested in an active identification process. As such, a broad application scope can be achieved, including applying to the identification of private-type data selected by the user.

Based on the method in FIG. 1, the implementations of the present specification further provide some example implementation solutions of the method, and the solutions are described below.

The method can further include: before the obtaining the first statistic information of the first data set (step 102), obtaining the first data set selected by a user; and determining the first statistic information of the first data set. The method can further include: before the obtaining the second statistic information of the second data set (step 104), obtaining the second data set including the at least a part of data samples corresponding to the to-be-identified field; and determining the second statistic information of the second data set.

The solution in the implementations of the present application can be applied to a scenario in which the user actively identifies data. In practice, when the user knows some private data and wants to identify data similar to the known private data, the user can select the private data as data of the first data set. A database for structured storage is taken as an example. When a certain field is known to be a private field, that is, when data corresponding to the field is private data, the data corresponding to the field can be selected as the data of the first data set. From the perspective of the user, data corresponding to one or more fields can be selected as the first data set.

From the perspective of the program, the first data set selected by the user can be obtained and the first statistic information of the first data set can be determined, the second statistic information is determined for another field in the database, and step 102 to step 110 are performed to determine a private field in the database that is the same as a private type of the data corresponding to the selected field and corresponding private data.

In the above active identification scenario, steps of obtaining the first data set and calculating the first statistic information and steps of obtaining the second data set and calculating the second statistic information can be performed sequentially on a same device, and for example, can be performed sequentially when the user identifies private data.

In conventional private data identification solutions, a specific private type needs to be pre-written in a regular expression rule-based identification method, and a large amount of sample data needs to be pre-labeled and a model needs to be pre-trained in an identification method based on a multi-classification model. These solutions can be applied only to a passive identification scenario. However, the solution in the implementations of the present application is an unsupervised solution. Even if there is no pre-written regular expression rule or pre-trained multi-classification model, similar private data can be easily identified by using statistic information based on the known private data selected by the user. That is, the solution in the implementations of the present application can be applied to both active identification and passive identification, and has a broader application scope.

When the solution in the implementations of the present application is applied to the passive identification scenario, in practice, first statistic information calculated based on private data of a certain type can be directly provided to the user, so that the user can use the provided first statistic information to determine data with statistic information similar to the first statistic information. From the perspective of the user, first statistic information of data of a specific type can be selectively obtained.

From the perspective of the program, the first statistic information can be obtained based on selection of the user, the second statistic information can be determined for the another field in the database, and step 102 to step 110 are performed to determine private field in the database that is of a same type as the data of the specific type and corresponding private data.

In the above passive identification scenario, steps of obtaining the first data set and calculating the first statistic information and steps of obtaining the second data set and calculating the second statistic information can be performed on different devices, the latter can be performed when the user identifies the private data, and the former can be pre-performed.

Regardless of the active identification scenario or the passive identification scenario, because this is private data identified based on statistic information, a calculation amount is small, a large amount of computing resources saved, and less time is consumed, so that private data identification can be quasi real-time.

In at least one implementation of the present application, a method for determining the first statistic information of the first data set and a method for determining the second statistic information of the second data set can be the same or can correspond to each other. For example, a method for determining the first length distribution vector of the first data set and a method for determining the second length distribution vector of the second data set can be the same or can correspond to each other. A method for determining the first character distribution statistical information of the first data set and a method for determining the second character distribution statistical information of the second data set can be the same or can correspond to each other. The following is described in detail by using the method for determining the second statistic information of the second data set as an example.

The determining the second statistic information of the second data set can include: determining the second length distribution vector of the second data set. For example, the second length distribution vector is initialized. A value of an i-th position in the second length distribution vector represents a number of data samples with a length i, and i is a positive integer less than or equal to a length of the second length distribution vector. The data samples in the second data set are traversed to obtain length information of each data sample. The second length distribution vector is determined based on the length information of each data sample.

For example, a second data set B is given, and a maximum length of a data sample is set to L. The length distribution vector is initialized as $V_B=[0, \ldots, 0]$, a length of a vector $V_B$ is L, and a value at a position i of the vector $V_B$ represents a number of data samples with a length i, $1 \leq i \leq L$. Each data sample in the data set B is scanned in sequence. For any $b_i \in B$, a length of $b_i$ is calculated, and a value at a corresponding position in $V_B$ is incremented by 1 to finally obtain the length distribution vector $V_B$. Similarly, for a first data set A, a length distribution vector $V_A$ can be obtained.

In at least one implementation of the present application, the determining second statistic information of the second data set can include: determining the second character distribution statistical information of the second data set. For example, at least one data subset is determined from the second data set based on lengths of the data samples in the second data set. Data samples in a same data subset have a same length. For each data subset, second character distribution statistical information of data samples in the data subset is determined.

The determining the second character distribution statistical information of the data samples in the data subset can in some embodiments include: for each length position of the data samples in the data subset, determining a character distribution vector corresponding to the length position based on characters included in the data samples in the data subset; and obtaining the second character distribution statistical information of the data samples in the data subset based on the character distribution vectors corresponding to the length positions.

The determining the character distribution vectors corresponding to the length positions can in some embodiments include: initializing a second character distribution vector, values in the second character distribution vector representing numbers of predetermined characters included in the data samples in the data subset at a corresponding length position; determining characters of each of the data samples in the data subset at the length positions; and determining the second character distribution vector based on the characters of the data samples in the data subset at the corresponding length position.

In the above example, second data set B can be classified by length, and data samples of a same length can be grouped together. Counting is performed for a certain type $B_n$, and n represents a length of a data sample of the type. For any position $j \in [1, n]$, one character distribution vector $V_j=[0, \ldots, 0]$ is initialized, a length of $V_j$ is a length of a predetermined character list C, and characters included in the predetermined character list C can be predetermined. In some embodiments, the characters included in the predetermined character list C can be characters with an occurrence probability in private data greater than a certain probability threshold. Each position of each data sample in data set $B_n$ is scanned in sequence, and a value at a corresponding position in $V_j$ is incremented by 1 based on a character at each position to finally obtain character distribution statistical information Statistic($B_n$)=$[V_1, \ldots, V_n]$. Similarly, for any type $A_m$ in the first data set A, Statistic($A_m$)=$[V_1, \ldots, V_m]$ can be obtained.

Figure 2:
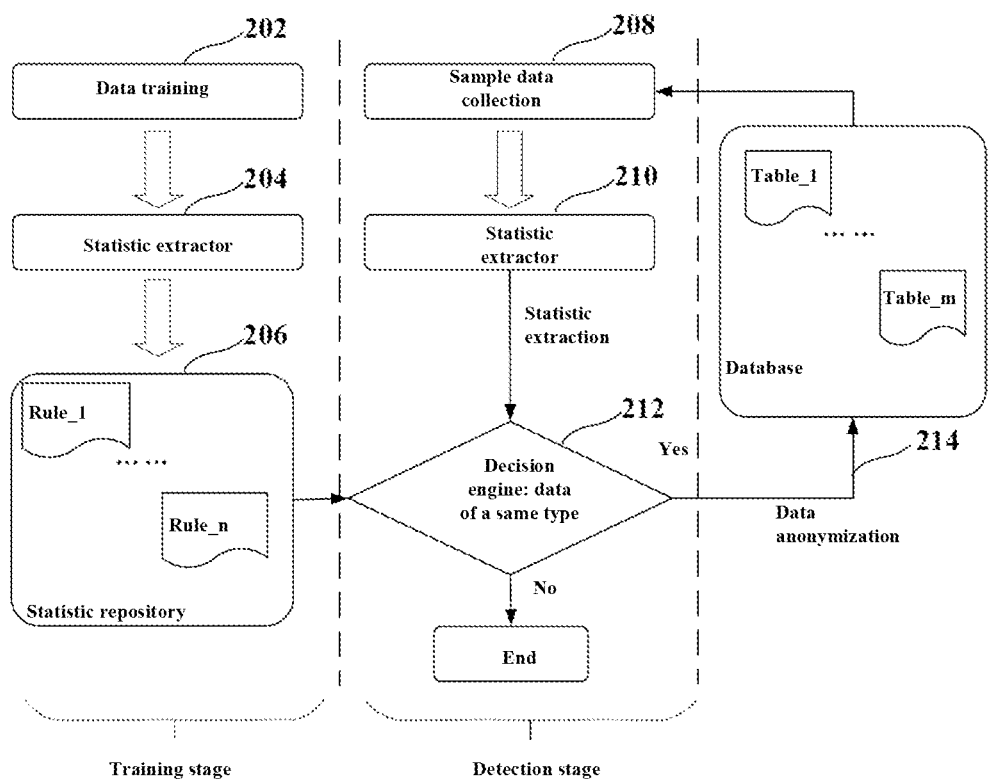
FIG. 2 is a schematic flowchart illustrating an overall solution of a method for identifying private data according to some implementations of the present specification.

FIG. 2 is a schematic flowchart illustrating an overall solution of a method for identifying private data according to some implementations of the present specification. As shown in FIG. 2, the solution can include a training stage and a detection stage.

At the training stage, a training data sample given by a user is obtained (step 202), and statistic information specific to the training data sample is extracted by using a statistic extractor (step 204). In some embodiments, the extracted statistic information is stored in a statistic repository (step 206). At the training stage of the implementations of the present application, the obtained training data sample given by the user can be a private data sample. As shown in FIG. 2, a rule_1 to a rule_n stored in a rule repository can correspond to statistic information obtained based on different types of private data.

It should be noted that the implementations of the present application provide an unsupervised private data identification solution without manual sample labeling. The training stage herein is different from a process of training a multi-classification model based on a labeled sample in the existing technologies. In the implementations of the present application, the training stage and the subsequent detection stage can be performed on a same device or different devices.

At the detection stage, all fields in a database are traversed, and a certain number of data samples are sampled from a test field (step 208). The sampled data samples are sent into the statistic extractor to extract statistic information (step 210). The statistic information of the training sample and statistic information of a test sample are input into a decision engine. The decision engine determines whether the test field and the training sample belong to a same type, determines that the test field is a private field in response to that the test field and the training sample belong to a same type, and determines that the test field is not a private field in response to that the test field and the training sample do not belong to a same type (step 212).

As shown in FIG. 2, a technical concept of at least one implementation of the present application includes: identifying private data based on statistic information of data. For example, when data in a first data set is data of a certain private data type, it can also be determined that data in a second data set is data of the private data type in response to that statistic information of the second data set is similar to statistic information of the first data set.

In practice, private data protection can be roughly divided into two parts. Protection of private data in a database is taken as an example. First, a private data field in the database needs to be identified, and then the identified private data field is encrypted by using various methods to effectively prevent the private data from being leaked. As shown in FIG. 2, the private data protection solution can further include: performing data anonymization on identified private data (step 214). In some embodiments, data identified as a private field can be anonymized based on the result of the detection stage. In some embodiments, a label for identifying private data can be added to the identified private field based on the result of the detection stage. Subsequently, when data corresponding to the field with the label is accessed, the accessed data can be anonymized.

Figure 3:
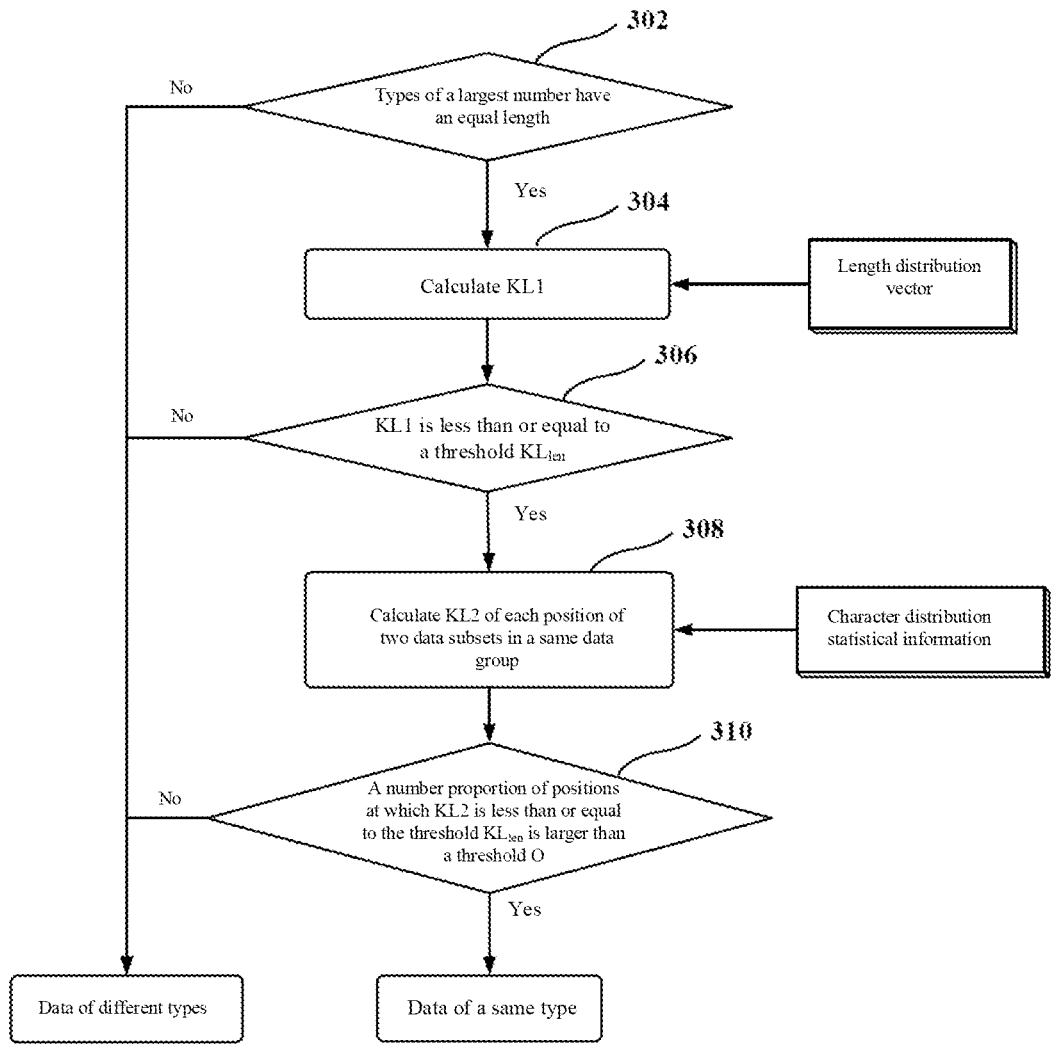
FIG. 3 is a schematic diagram illustrating a decision process according to some implementations of the present application.

The following further describes a process of the decision engine in FIG. 2. FIG. 3 is a schematic diagram of a decision process according to some implementations of the present application. The decision process can be divided into two stages: determining based on length distribution and determining based on character distribution.

As shown in FIG. 3, the method can further include: before the determining the length distribution similarity between the first data set and the second data set, determining that a length corresponding to the largest number of data samples in the first data set is the same as a length corresponding to the largest number of data samples in the second data set (step 302).

In the above example, assume that data subset $A_m$ represents one of the first data set's subsets that has the largest number of data, and data subset $B_n$ represents one of the second data set's subsets that has the largest number of data. Before one or more of the length distribution similarity or the character distribution similarity between the data subset $A_m$ of the first data set A and the data subset $B_n$ of the second data set B is calculated, whether m equals to n can be determined first, the process proceeds in response to that a determining result is yes, and the process ends in response to that a determining result is no. A reason for performing the above determining step is that the solution in the implementations of the present application is based on an algorithm assumption that length distribution of data of a same type should be consistent or similar. Therefore, two data sets whose sample lengths are inconsistent are generally considered not to belong to a same type. Before relatively complex calculation such as length similarity determining and character similarity determining is performed, the above determining step is performed. This equivalent to primary screening, thereby consuming few resources and improving overall efficiency of the private data identification solution.

In the implementations of the present application, a Kullback-Leibler (KL) distance can be used to measure a distribution difference. The KL distance is KL divergence for short, also known as relative entropy. The KL distance can be used to measure a difference between two probability distributions in same event space.

For a given distribution P(x) and distribution Q(x), a KL distance between the distribution P(x) and the distribution Q(x) can be defined as follows:

$$KL(P, Q) = \sum_{x \in X} P(x) \log \frac{P(x)}{Q(x)}$$

A smaller value of the KL distance KL(P, Q) indicates that the distribution P(x) is more similar to the distribution Q(x). When the probability distribution P(x) and the probability distribution Q(x) are completely the same, a value of the corresponding KL distance KL(P, Q) is 0.

It should be noted that in the above equation, the KL distance between the distribution P(x) and the distribution Q(x) is defined as a distance of the distribution P(x) relative to the distribution Q(x). In one or more implementations of the present application, a first KL distance between the first length distribution vector and the second length distribution vector can be a distance of the first length distribution vector relative to the second length distribution vector. Correspondingly, a second KL distance between the first character distribution vector and the second character distribution vector can be a distance of the first length distribution vector relative to the second length distribution vector. Correspondingly, a similarity value between the first data set and the second data set can be a similarity value of the first data set relative to the second data set.

As shown in FIG. 3, the determining the length distribution similarity between the first data set and the second data set based on the first length distribution vector and the second length distribution vector can in some embodiments include: calculating a first KL distance KL1 between the first length distribution vector and the second length distribution vector (step 304). Therefore, the determining that the length distribution similarity meets the first predetermined condition can in some embodiments include: determining that the first KL distance KL1 is less than or equal to a first KL threshold $KL_{len}$ (step 306).

In the above example, the first KL distance KL1 between the first length distribution vector and the second length distribution vector is calculated, that is, a first KL distance $KL(V_A, V_B)$ between the first length distribution vector $V_A$ and the second length distribution vector $V_B$ is calculated. Whether the first KL distance $KL(V_A, V_B)$ is smaller than or equal to the first KL threshold $KL_{len}$ is determined. In response to that the first KL distance $KL(V_A, V_B)$ is smaller than or equal to the first KL threshold $KL_{len}$, the sample length distribution of the first data set A is consistent with the sample length distribution of the second data set B, the two data sets are data of a same type, and the process proceeds. In response to that the first KL distance $KL(V_A, V_B)$ is not smaller than or equal to the first KL threshold $KL_{len}$, the sample length distribution of the first data set A is inconsistent with the sample length distribution of the second data set B, the two data sets are data of different types, and the process ends.

As shown in FIG. 3, the determining the character distribution similarity between the first data set and the second data set based on the first character distribution statistical information and the second character distribution statistical information can In some embodiments include: determining at least one data group, each data group including a first data subset and a second data subset, a data sample length of the first data subset being the same as a data sample length of the second data subset in a same data group, data samples in the first data subset being selected from the first data set, and data samples in the second data subset being selected from the second data set; for each data group in the at least one data group, calculating a similarity sub-value between first character distribution statistical information of the first data subset and second character distribution statistical information of the second data subset; and determining a similarity value between the first data set and the second data set based on the similarity sub-value corresponding to each data group in the at least one data group.

For example, the calculating the similarity sub-value between the first character distribution statistical information of the first data subset and the second character distribution statistical information of the second data subset can include: for each length position of the first data subset and the second data subset, calculating a second KL distance between a first character distribution vector and a second character distribution vector to obtain a plurality of second KL distances (step 308); determining a first number of second KL distances that are in the plurality of second KL distances and that are less than or equal to a second KL threshold; and calculating, as the similarity sub-value, a first ratio of the first number to a total number of the plurality of second KL distances. For any length position, in response to that the second KL distance is less than or equal to the second KL threshold, it indicates that a character distribution of the first data subset and a character distribution of the second data subset are consistent at the position. The ratio represents a proportion of positions where the character distribution of the first data subset is consistent with the character distribution of the second data subset, that is, a degree to which the character distribution of the first data subset is consistent with the character distribution of the second data subset.

In the above example, the second KL distance is calculated for a character distribution vector at each position of Statistic($A_m$) and Statistic($B_n$), and character distributions at the position are considered to be consistent in response to that the second distance is smaller than or equal to the second KL threshold $KL_{char}$. Finally, whether to-be-identified data and selected data are data of a same type is determined based on whether a proportion of a number of positions where character distributions are consistent to sample lengths exceeds a coverage threshold O (step 310).

In some implementations, the determining the similarity value between the first data set and the second data set can include: determining a similarity sub-value corresponding to one data group meeting a predetermined condition as the similarity value between the first data set and the second data set. Therefore, the determining that the character distribution similarity meets the second predetermined condition can in some embodiments include: determining that the similarity value is greater than a predetermined similarity threshold. In some embodiments, meeting the predetermined condition can be that the at least one data group includes the one data group. In some embodiments, the data group meeting the predetermined condition can be a data group with a largest number of data samples in the at least one data group.

In the above solution in which the similarity sub-value corresponding to the one data group meeting the predetermined condition is determined as the similarity value between the first data set and the second data set, the proportion of the number of the positions where character distributions are consistent in the data group meeting the predetermined condition to sample lengths is calculated, whether the proportion exceeds the coverage threshold O is determined, the data set A and the data set B are considered to be of a same type in response to that the proportion exceeds the coverage threshold O, and the data set A and the data set B do not belong to a same type in response to that the proportion does not exceed the coverage threshold O. In the solution, a similarity sub-value is calculated based on one data group in a plurality of data groups and is used as a final character distribution similarity value between the first data set and the second data set, thereby saving computing resources to a certain extent and improving calculation efficiency. When different data groups have uneven data volume distributions, interference information can be reduced and robustness of data identification can be improved.

In some other implementations, the determining the similarity value between the first data set and the second data set can specifically include: calculating the similarity value between the first data set and the second data set based on similarity sub-values corresponding to two or more data groups in the at least one data group. For example, the similarity value between the first data set and the second data set can be calculated based on the similarity sub-values corresponding to the two or more data groups in the at least one data group and voting weighted values corresponding to the two or more data groups. Therefore, the determining that the character distribution similarity meets the second predetermined condition can in some embodiments include: determining that the similarity value is greater than a predetermined similarity threshold.

In some solutions, for types $A_{m1}, \ldots, A_{mk}$ and types $B_{n1}, \ldots, B_{nk}$, corresponding character distribution statistical information is Statistic($A_{m1}$), ..., Statistic($A_{mk}$) and Statistic($B_{n1}$), ..., Statistic($B_{nk}$). For any one group of a data set $A_{mk}$ and a data set $B_{nk}$, a similarity sub-value between the data set $A_{mk}$ and the data set $B_{nk}$ can be calculated based on Statistic($A_{mk}$) and Statistic($B_{nk}$). Finally, a similarity value between Statistic($A_m$) and Statistic($B_n$) can be calculated based on a similarity sub-value corresponding to each group of data sets, and whether the data set A and the data set B belong to a same type is further determined based on the similarity value. In the solution, the character distribution similarity between the first data set and the second data set is determined based on the similarity sub-values of the plurality of data groups, thereby improving accuracy of an identification result. For example, when the data groups have even data volume distributions, an effect of improving accuracy of the identification result is more significant.

In some implementations, the determining the similarity value between the first data set and the second data set can specifically include: determining a second ratio of a number of data groups that are in the at least one data group and whose similarity sub-values are greater than the predetermined similarity threshold to a total number of data groups in the at least one data group. Therefore, that the character distribution similarity meets the second predetermined condition can specifically include: the second ratio is larger than a predetermined ratio.

In the still some other implementations, for the types $A_{m1}, \ldots, A_{mk}$ and the types $B_{n1}, \ldots, B_{nk}$, the corresponding character distribution statistical information is Statistic ($A_{m1}$), ..., Statistic($A_{mk}$) and Statistic($B_{n1}$), ..., Statistic ($B_{nk}$). Whether a data set $A_{m1}$ and a data set $B_{n1}$ belong to a same type can be determined based on Statistic($A_{m1}$) and Statistic($B_{n1}$). Similarly, whether the data set $A_{mk}$ and the data set $B_{nk}$ belong to a same type is determined. Finally, whether the data set A and the data set B belong to a same type is determined though voting.

In at least one implementation of the present application, the method can further include: before the determining the length distribution similarity between the first data set and the second data set based on the first length distribution vector and the second length distribution vector and the determining the character distribution similarity between the first data set and the second data set based on the first character distribution statistical information and the second character distribution statistical information, normalizing the first length distribution vector, the second length distribution vector, a vector at each position in the first character distribution statistical information, and a vector at each position in the second character distribution statistical information. In the above example, $V_A$, $V_B$, a vector at each position in Statistic($A_m$), and a vector at each position in Statistic($B_n$) can be respectively normalized before each determining step of a decision module is performed.

Referring back to FIG. 2, in at least one implementation of the present application, the method can further include: after the determining the data corresponding to the to-be-identified field as the private data of the same type as the first data set, anonymizing the data corresponding to the to-be-identified field. For example, a predetermined data anonymization method can be used to anonymize the data corresponding to the to-be-identified field. In some embodiments, when an access request for the data corresponding to the to-be-identified field is received, accessed data can be anonymized, and the anonymized data can be fed back to a data requester.

In some implementations, the predetermined data anonymization method can include: masking at least a part of characters in the private data; replacing the private data with a hash value of the private data; or keeping a data length unchanged, and replacing the at least a part of characters of the private data. No limitation is imposed.

In practice, for private data of different types, a same predetermined anonymization method or different predetermined anonymization methods can be used to anonymize the private data. As an example, for private data of a mobile phone number type, in some embodiments, a method of masking at least a part of characters in the private data can be used, for example, a mobile phone number "18866668888" is anonymized to obtain "188*****888". In some embodiments, a method of replacing the private data with a hash value of the private data can be used, for example, a hash (34240118600913257X) value is used to replace an identity card number "34240118600913257X". A private data anonymization method is not limited to the above example.

In at least one implementation of the present application, after the determining the data corresponding to the to-be-identified field as the private data of the same type as the data of the first data set, a label can further be added to the to-be-identified field. The label can be used to indicate whether the data corresponding to the to-be-identified field is private data. A field whose corresponding data is private data can be referred to as a private field. In some embodiments, a label used to represent a private field can be added only to the private field instead of a non-private field. In some embodiments, a label used to represent a private field can be added to the private field and a label used to represent a non-private field can be added to the non-private field. Therefore, when data identified as a private field is accessed, the predetermined anonymization method can be used to anonymize the accessed data based on the label of the private field.

In the above solution, when the private data is requested, the requested private data is anonymized to prevent the private data from being leaked, thereby protecting security of the private data.

In one or more implementations of the present application, a language type of the data samples in the first data set and a language type of the data samples in the second data set include English, French, or Chinese, and the language type of the data samples in the first data set is the same as the language type of the data samples in the second data set. For example, both the language type of the data samples in the first data set and the language type of the data samples in the second data set are English.

Figure 4:
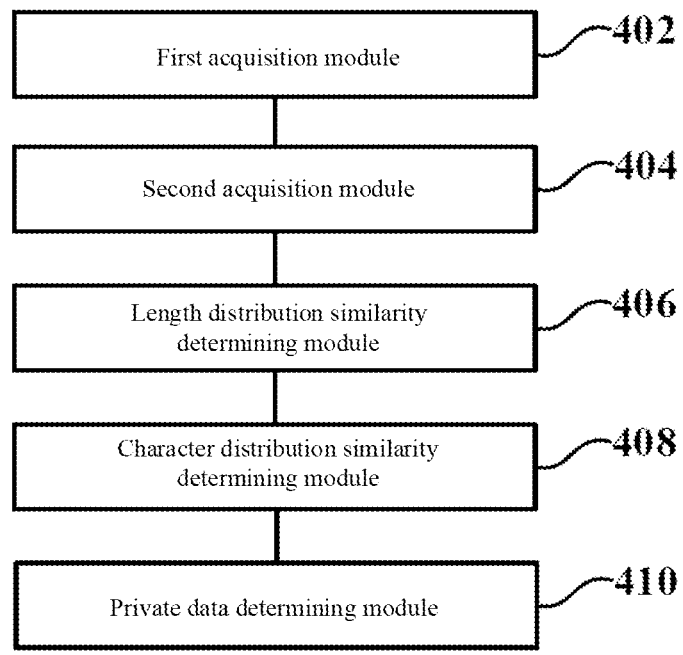
FIG. 4 is a schematic structural diagram illustrating an apparatus for identifying private data corresponding to FIG. 1 according to some implementations of the present specification.

Based on a same idea, implementations of the present specification further provide an apparatus corresponding to the above method. FIG. 4 is a schematic structural diagram illustrating a data identification apparatus corresponding to FIG. 1 according to some implementations of the present specification. As shown in FIG. 4, the apparatus can include: a first acquisition module 402, configured to obtain first statistic information of a first data set, the first data set being a set of private data samples, and the first statistic information including a first length distribution vector and first character distribution statistical information of the first data set; a second acquisition module 404, configured to obtain second statistic information of a second data set, the second data set being a set of private data samples, and the second statistic information including a second length distribution vector and second character distribution statistical information of the second data set; a length distribution similarity determining module 406, configured to determine a length distribution similarity between the first data set and the second data set based on the first length distribution vector and the second length distribution vector; a character distribution similarity determining module 408, configured to determine a character distribution similarity between the first data set and the second data set based on the first character distribution statistical information and the second character distribution statistical information in response to determining that the length distribution similarity meets a first predetermined condition; and a private data determining module 410, configured to determine data corresponding to a to-be-identified field as private data of a same type as the first data set in response to determining that the character distribution similarity meets a second predetermined condition.

Based on the apparatus shown in FIG. 4, the implementations of the present specification further provide some example implementation solutions of the apparatus, and the solutions are described below.

In at least one implementation of the present application, the apparatus can further include: a first statistic information determining module, configured to obtain the first data set selected by a user, and determine the first statistic information of the first data set.

The apparatus can further include: a second statistic information determining module, configured to obtain the second data set including the at least a part of data samples corresponding to the to-be-identified field, and determine the second statistic information of the second data set.

In some embodiments, the second statistic information determining module can be configured to determine the second length distribution vector of the second data set, and is specifically configured to: initialize the second length distribution vector, a value of an i-th position in the second length distribution vector representing a number of data samples with a length i, and i being a positive integer less than or equal to a length of the second length distribution vector; traverse data samples in the second data set to obtain length information of each data sample; and determine the second length distribution vector based on the length information of each data sample.

In some embodiments, the second statistic information determining module can be configured to determine the second character distribution statistical information of the second data set, and is specifically configured to: determine at least one data subset from the second data set based on lengths of the data samples in the second data set, data samples in a same data subset having a same length; and for each data subset, determine second character distribution statistical information of data samples in the data subset.

In some embodiments, the determining the second character distribution statistical information of the data samples in the data subset can specifically include: for each length position of the data samples in the data subset, determining a character distribution vector corresponding to the length position based on characters included in the data samples in the data subset; and obtaining the second character distribution statistical information of the data samples in the data subset based on the character distribution vectors corresponding to the length positions.

In some embodiments, the determining the character distribution vectors corresponding to the length positions can specifically include: initializing a second character distribution vector, values in the second character distribution vector representing numbers of predetermined characters included in the data samples in the data subset at a corresponding length position; determining the characters of each of the data samples in the data subset at the length positions; and determining the second character distribution vector based on the characters of the data samples in the data subset at the corresponding length position.

In at least one implementation of the present application, the length distribution similarity determining module 406 can be specifically configured to calculate a first KL distance between the first length distribution vector and the second length distribution vector. Correspondingly, the determining that the length distribution similarity meets the first predetermined condition can specifically include: determining that the first KL distance is less than or equal to a first KL threshold.

In at least one implementation of the present application, the character distribution similarity determining module 408 can be specifically configured to: determine at least one data group, each data group including a first data subset and a second data subset, a data sample length of the first data subset being the same as a data sample length of the second data subset in a same data set, data samples in the first data subset being selected from the first data set, and data samples in the second data subset being selected from the second data set; for each data group in the at least one data group, calculate a similarity sub-value between first character distribution statistical information of the first data subset and second character distribution statistical information of the second data subset; and determine a similarity value between the first data set and the second data set based on the similarity sub-value corresponding to each data group in the at least one data group.

The calculating the similarity sub-value between the first character distribution statistical information of the first data subset and the second character distribution statistical information of the second data subset can specifically include: for each length position of the first data subset and the second data subset, calculating a second KL distance between a first character distribution vector and a second character distribution vector to obtain a plurality of second KL distances; determining a first number of second KL distances that are in the plurality of second KL distances and that are less than or equal to a second KL threshold; and calculating a first ratio of the first number to a total number of the plurality of second KL distances.

In some embodiments, the determining the similarity value between the first data set and the second data set can specifically include: determining a similarity sub-value corresponding to one data group meeting a predetermined condition as the similarity value between the first data set and the second data set. Correspondingly, the determining that the character distribution similarity meets the second predetermined condition can specifically include: determining that the similarity value is greater than a predetermined similarity threshold.

In some embodiments, the determining the similarity value between the first data set and the second data set can specifically include: calculating the similarity value between the first data set and the second data set based on similarity sub-values corresponding to two or more data groups in the at least one data group. Correspondingly, the determining that the character distribution similarity meets the second predetermined condition can specifically include: determining that the similarity value is greater than a predetermined similarity threshold.

In at least one implementation of the present application, the following is further included: before the determining the length distribution similarity between the first data set and the second data set, determining that a length corresponding to the largest number of data samples in the first data set is the same as a length corresponding to the largest number of data samples in the second data set.

In at least one implementation of the present application, a language type of the data samples in the first data set and a language type of the data samples in the second data set include English, French, or Chinese, and the language type of the data samples in the first data set is the same as the language type of the data samples in the second data set.

In at least one implementation of the present application, the apparatus can further include an anonymization module, configured to anonymize the data corresponding to the to-be-identified field.

It can be understood that, each of the above modules refers to a computer program or program segment for performing a particular function or functions. Moreover, distinction between the above modules does not mean that actual program codes also need to be separated.

Based on a same idea, implementations of the present specification further provide a device corresponding to the above method.

Figure 5:
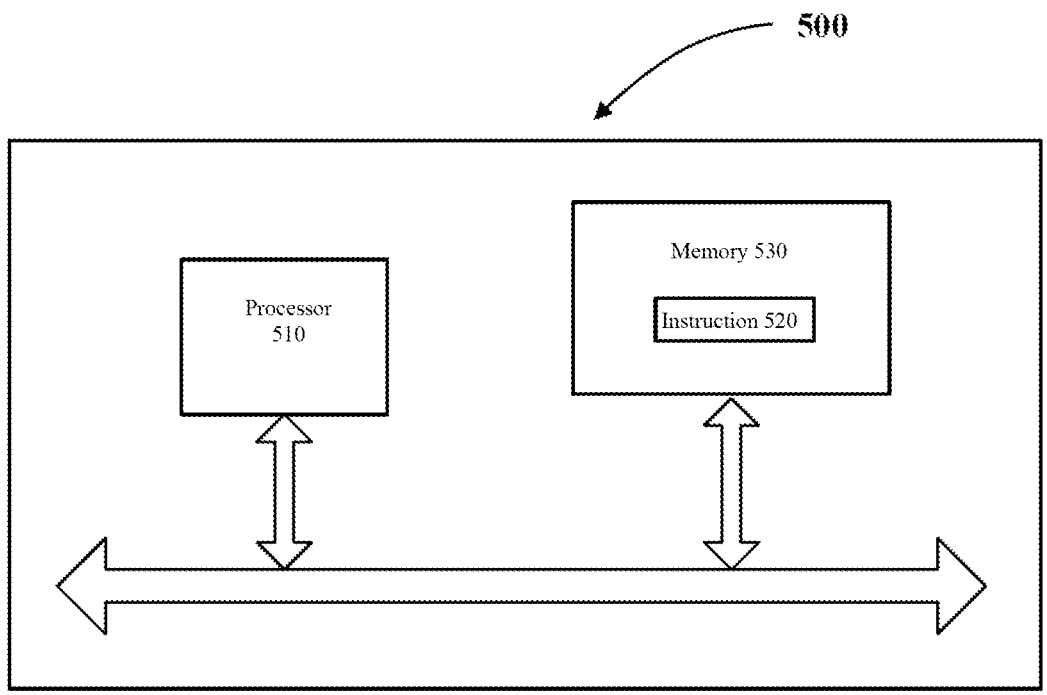
FIG. 5 is a schematic structural diagram illustrating a device for identifying private data corresponding to FIG. 1 according to some implementations of the present specification.

FIG. 5 is a schematic structural diagram illustrating a device for identifying private data corresponding to FIG. 1 according to some implementations of the present specification. As shown in FIG. 5, the device 500 can include: at least one processor 510, and a memory 530 communicatively connected to the at least one processor, the memory 530 storing an instruction 520 that can be executed by the at least one processor 510, and the instruction being executed by the at least one processor 510 to enable the at least one processor 510 to: obtain first statistic information of a first data set, the first data set being a set of private data samples, and the first statistic information including a first length distribution vector and first character distribution statistical information of the first data set; obtain second statistic information of a second data set, the second data set being a set of at least a part of data samples corresponding to a to-be-identified field, and the second statistic information including a second length distribution vector and second character distribution statistical information of the second data set; determine a length distribution similarity between the first data set and the second data set based on the first length distribution vector and the second length distribution vector; determine a character distribution similarity between the first data set and the second data set based on the first character distribution statistical information and the second character distribution statistical information in response to determining that the length distribution similarity meets a first predetermined condition; and determine data corresponding to the to-be-identified field as private data of a same type as the first data set in response to determining that the character distribution similarity meets a second predetermined condition.

Based on a same idea, implementations of the present specification further provide a computer readable medium corresponding to the above method. A computer readable instruction is stored on the computer readable medium, and the computer readable instruction can be executed by a processor to implement the following method: obtaining first statistic information of a first data set, the first data set being a set of private data samples, and the first statistic information including a first length distribution vector and first character distribution statistical information of the first data set; obtaining second statistic information of a second data set, the second data set being a set of at least a part of data samples corresponding to a to-be-identified field, and the second statistic information including a second length distribution vector and second character distribution statistical information of the second data set; determining a length distribution similarity between the first data set and the second data set based on the first length distribution vector and the second length distribution vector; determine a character distribution similarity between the first data set and the second data set based on the first character distribution statistical information and the second character distribution statistical information in response to determining that the length distribution similarity meets a first predetermined condition; and determine data corresponding to the to-be-identified field as private data of a same type as the first data set in response to determining that the character distribution similarity meets a second predetermined condition.

The example implementations of the present specification are described above. In some cases, the actions or steps described in the claims can be performed in an order different from the order in the implementations and can still achieve the desired results. In addition, the process depicted in the accompanying drawings does not necessarily require the shown particular order or consecutive sequence to achieve the desired results. In some implementations, multitask processing and parallel processing can or may be advantageous.

The implementations in the present specification are described in a progressive way. For same or similar parts of the implementations, references can be made to the implementations mutually. Each implementation focuses on a difference from other implementations.

The apparatus, device, and computer-readable medium provided in the implementations of the present specification correspond to the method. Therefore, the apparatus, device, and computer-readable medium also have beneficial technical effects that are similar to those of corresponding method. Because the beneficial technical effects of the method have been described in detail above, the beneficial technical effects of the corresponding apparatus, device, and computer-readable medium details are omitted here for simplicity.

In the 1990s, whether technology improvement was hardware improvement (for example, improvement of a circuit structure, such as a diode, a transistor, or a switch) or software improvement (improvement of a method procedure) could be clearly distinguished. However, with the development of technologies, current improvement for many method procedures can be considered as direct improvement of hardware circuit structures. A designer usually programs an improved method procedure to a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also know that, in addition to implementing a controller by using computer-readable program code, the method steps can be logically programmed, so that the controller implements the same functions in the form of a logic gate, a switch, an application-specific integrated circuit, a programmable logic controller, an embedded microcontroller, etc. Therefore, the controller can be regarded as a hardware component, and an apparatus included therein for implementing various functions can also be regarded as the structure within the hardware component. Or even, the apparatus for implementing various functions can be regarded as both a software module for implementing a method and the structure within the hardware component.

The system, apparatus, module, or unit illustrated in the above example implementations can be implemented by a computer chip or an entity, or can be implemented by a product with a certain function. A typical implementation device is a computer. The computer can be, for example, a personal computer, a laptop computer, a cellular phone, a camera phone, an intelligent phone, a personal digital assistant, a media player, a navigation device, an email transceiver device, a game console, a tablet computer, a wearable device, or any combination thereof.

For ease of description, the above apparatus is divided into various modules based on functions for separate description. Certainly, during implementation of the present application, the functions of the modules can be implemented in the same or more pieces of software and/or hardware.

A person skilled in the art should understand that the implementations of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer-usable storage media (including but not limited to a magnetic disk memory, a CD-ROM, an optical memory, etc.) that include computer-usable program code.

The present specification is described with reference to flowcharts and/or block diagrams of methods, devices (systems), and computer program products according to the implementations of the present specification. It should be understood that each flow and/or block in the flowcharts and/or block diagrams, and combinations of flows and/or blocks in the flowcharts and/or block diagrams can be implemented by using computer program instructions. These computer program instructions can be provided to a processor of a general-purpose computer, a special-purpose computer, an embedded processor or another programmable data processing device to produce a machine, so that the instructions executed by the processor of the computer or another programmable data processing device produce a device for implementing functions specified in one or more flows in the flowchart and/or one or more blocks in the block diagram.

These computer program instructions can also be stored in a computer-readable memory that can direct a computer or another programmable data processing device to operate in a specific way, so that the instructions stored in the computer-readable memory produce an article of manufacture including an instruction device, and the instruction device implements functions specified in one or more flows of the flowchart and/or one or more blocks of the block diagram.

These computer program instructions can also be loaded onto a computer or another programmable data processing device, so that a series of operation steps are executed on the computer or another programmable device to perform computer-implemented processing, and thus the instructions executed on the computer or another programmable device provide steps for implementing functions specified in one or more flows of the flowchart and/or one or more blocks of the block diagram.

In a typical configuration, a calculating device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of storage media of a computer include, but are not limited to, a PRAM (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a read-only memory (CD-ROM), a digital multi-function disk (DVD) or another optical storage, a magnetic cassette tape, a magnetic disk storage or another magnetic storage device, or any other non-transmission medium, and may be configured to store information accessible to a computing device. Based on the definition in the present specification, the computer readable medium does not include transitory media such as a modulated data signal and carrier.

It should also be noted that the term "include", "comprise", or their any other variant is intended to cover a non-exclusive inclusion, so that a process, method, commodity, or device that includes a series of elements not only includes those elements but also includes other elements that are not expressly listed, or further includes elements inherent to such process, method, commodity, or device. An element preceded by "includes a . . . " does not, without more constraints, preclude the presence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk memory, a CD-ROM, an optical memory, etc.) that include computer-usable program code.

The present application can be described in common contexts of computer-executable instructions executed by a computer, such as a program module. Generally, the program module includes a routine, program, object, component, data structure, etc., for executing a particular task or implementing a particular abstract data type. Alternatively, the present application can be practiced in distributed computing environments. In these distributed computing environments, tasks are executed by remote processing devices that are connected by using a communications network. In a distributed computing environment, program modules can be located in both local and remote computer storage media including storage devices.

The above descriptions are merely implementations of the present application and are not intended to limit the present application. For a person skilled in the art, the present application can be subject to various modifications and variations. Any modifications, equivalent replacements, improvements, etc., that are made within the spirit and principles of the present application shall all be included within the scope of the claims of the present application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for identifying private data, comprising:
   training an unsupervised learning model by at least
      obtaining first statistic information of a first data set, the first data set being a set of private data samples, and the first statistic information including a first length distribution vector and first character distribution statistical information of the first data set;
   obtaining second statistic information of a second data set, the second data set being a set of data samples corresponding to a to-be-identified field, and the second statistic information including a second length distribution vector and second character distribution statistical information of the second data set;
   using the unsupervised learning model to detect private data by at least:
      determining a length distribution similarity between the first data set and the second data set based on the first length distribution vector and the second length distribution vector;
      determining a character distribution similarity between the first data set and the second data set based on the first character distribution statistical information and the second character distribution statistical information in response to determining that the length distribution similarity meets a first predetermined condition; and
      determining data corresponding to the to-be-identified field as private data of a same type as the first data set in response to determining that the character distribution similarity meets a second predetermined condition; and
   performing anonymization on the data corresponding to the to-be-identified field to prevent private data from being leaked.

2. The method according to claim 1, further comprising:
   before the obtaining the first statistic information of the first data set, obtaining the first data set selected by a user; and
   determining the first statistic information of the first data set.

3. The method according to claim 1, wherein the obtaining the second statistic information of the second data set includes determining the second length distribution vector of the second data set by:
   initializing the second length distribution vector, a value at an i-th position in the second length distribution vector representing a number of data samples with a length i, and i being a positive integer less than or equal to a length of the second length distribution vector;
   traversing data samples in the second data set to obtain length information of each data sample; and
   determining the second length distribution vector based on the length information of each data sample.

4. The method according to claim 1, wherein the obtaining the second statistic information of the second data set includes:
   determining at least one data subset from the second data set based on lengths of data samples in the second data set, data samples in a same data subset having a same length; and for each data subset from the second data set, determining second character distribution statistical information of data samples in the data subset.

5. The method according to claim 4, wherein the determining the second character distribution statistical information of the data samples in the data subset includes:
for each length position of the data samples in the data subset, determining a character distribution vector corresponding to the length position based on characters included in the data samples in the data subset; and
obtaining the second character distribution statistical information of the data samples in the data subset based on the character distribution vectors corresponding to the length positions.

6. The method according to claim 1, wherein the determining the length distribution similarity between the first data set and the second data set based on the first length distribution vector and the second length distribution vector specifically includes:
calculating a first KL distance between the first length distribution vector and the second length distribution vector; and
wherein the determining that the length distribution similarity meets the first predetermined condition includes: determining that the first KL distance is less than or equal to a first KL threshold.

7. The method according to claim 1, wherein the determining the character distribution similarity between the first data set and the second data set based on the first character distribution statistical information and the second character distribution statistical information specifically includes:
determining at least one data group, each data group including a first data subset and a second data subset, a data sample length of the first data subset being the same as a data sample length of the second data subset in a same data group, data samples in the first data subset being selected from the first data set, and data samples in the second data subset being selected from the second data set;
for each data group in the at least one data group, calculating a similarity sub-value between first character distribution statistical information of the first data subset and second character distribution statistical information of the second data subset; and
determining a similarity value between the first data set and the second data set based on the similarity sub-value corresponding to each data group in the at least one data group.

8. The method according to claim 7, wherein the calculating the similarity sub-value between the first character distribution statistical information of the first data subset and the second character distribution statistical information of the second data subset includes:
for each length position of the first data subset and the second data subset, calculating a second KL distance between a first character distribution vector and a second character distribution vector to obtain a plurality of second KL distances;
determining a first number of second KL distances that are in the plurality of second KL distances and that are less than or equal to a second KL threshold; and
calculating a first ratio between the first number and a total number of the plurality of second KL distances.

9. The method according to claim 7, wherein the determining the similarity value between the first data set and the second data set includes:

determining a similarity sub-value corresponding to one data group meeting a predetermined condition as the similarity value between the first data set and the second data set; and
wherein the determining that the character distribution similarity meets the second predetermined condition includes:
determining that the similarity value is greater than a predetermined similarity threshold.

10. The method according to claim 7, wherein the determining the similarity value between the first data set and the second data set includes:
calculating the similarity value between the first data set and the second data set based on similarity sub-values corresponding to two or more data groups from the at least one data group; and
wherein the determining that the character distribution similarity meets the second predetermined condition includes:
determining that the similarity value is greater than a predetermined similarity threshold.

11. The method according to claim 1, further comprising:
before the determining the length distribution similarity between the first data set and the second data set, determining that a length corresponding to the largest number of data samples in the first data set is the same as a length corresponding to the largest number of data samples in the second data set.

12. The method according to claim 1, wherein a language type of the data samples in the first data set and a language type of the data samples in the second data set include at least one of English, French, or Chinese, and the language type of the data samples in the first data set is the same as the language type of the data samples in the second data set.

13. The method according to claim 1, further comprising:
after the determining the data corresponding to the to-be-identified field as the private data of the same type as the first data set, anonymizing the data corresponding to the to-be-identified field.

14. A non-transitory computer readable medium storing contents that, when executed by one or more processors, cause the one or more processors to perform actions comprising:
training an unsupervised learning model by at least obtaining first statistic information of a first data set, the first data set being a set of private data samples, and the first statistic information including a first length distribution vector and first character distribution statistical information of the first data set;
obtaining second statistic information of a second data set, the second data set being a set of data samples corresponding to a to-be-identified field, and the second statistic information including a second length distribution vector and second character distribution statistical information of the second data set;
using the unsupervised learning model to detect private data by at least:
determining a length distribution similarity between the first data set and the second data set based on the first length distribution vector and the second length distribution vector;
determining a character distribution similarity between the first data set and the second data set based on the first character distribution statistical information and the second character distribution statistical information in response to determining that the length distribution similarity meets a first predetermined condition; and determining data corresponding to the to-be-identified field as private data of a same type as the first data set in response to determining that the character distribution similarity meets a second predetermined condition; and performing anonymization on the data corresponding to the to-be-identified field to prevent private data from being leaked.

15. The computer readable medium according to claim 14, wherein the actions further comprise:

before the obtaining the first statistic information of the first data set, obtaining the first data set selected by a user; and determining the first statistic information of the first data set.

16. The computer readable medium according to claim 14, wherein the obtaining the second statistic information of the second data set includes determining the second length distribution vector of the second data set by:

initializing the second length distribution vector, a value at an i-th position in the second length distribution vector representing a number of data samples with a length i, and i being a positive integer less than or equal to a length of the second length distribution vector;

traversing data samples in the second data set to obtain length information of each data sample; and determining the second length distribution vector based on the length information of each data sample.

17. The computer readable medium according to claim 14, wherein the obtaining the second statistic information of the second data set includes:

determining at least one data subset from the second data set based on lengths of data samples in the second data set, data samples in a same data subset having a same length; and for each data subset from the second data set, determining second character distribution statistical information of data samples in the data subset.

18. The computer readable medium according to claim 17, wherein the determining the second character distribution statistical information of the data samples in the data subset includes:

for each length position of the data samples in the data subset, determining a character distribution vector corresponding to the length position based on characters included in the data samples in the data subset; and obtaining the second character distribution statistical information of the data samples in the data subset based on the character distribution vectors corresponding to the length positions.

19. The computer readable medium according to claim 14, wherein the determining the length distribution similarity between the first data set and the second data set based on the first length distribution vector and the second length distribution vector specifically includes:

calculating a first KL distance between the first length distribution vector and the second length distribution vector; and wherein the determining that the length distribution similarity meets the first predetermined condition includes: determining that the first KL distance is less than or equal to a first KL threshold.

20. A system, comprising:
one or more processors; and
memory storing contents that, when executed by the one or more processors, cause the system to perform actions comprising:

training an unsupervised learning model by at least obtaining first statistic information of a first data set, the first data set being a set of private data samples, and the first statistic information including a first length distribution vector and first character distribution statistical information of the first data set;

obtaining second statistic information of a second data set, the second data set being a set of data samples corresponding to a to-be-identified field, and the second statistic information including a second length distribution vector and second character distribution statistical information of the second data set;

using the unsupervised learning model to detect private data by at least:

determining a length distribution similarity between the first data set and the second data set based on the first length distribution vector and the second length distribution vector;

determining a character distribution similarity between the first data set and the second data set based on the first character distribution statistical information and the second character distribution statistical information in response to determining that the length distribution similarity meets a first predetermined condition; and determining data corresponding to the to-be-identified field as private data of a same type as the first data set in response to determining that the character distribution similarity meets a second predetermined condition; and performing anonymization on the data corresponding to the to-be-identified field to prevent private data from being leaked.

21. The system according to claim 20, wherein the determining the character distribution similarity between the first data set and the second data set based on the first character distribution statistical information and the second character distribution statistical information specifically includes:

determining at least one data group, each data group including a first data subset and a second data subset, a data sample length of the first data subset being the same as a data sample length of the second data subset in a same data group, data samples in the first data subset being selected from the first data set, and data samples in the second data subset being selected from the second data set;

for each data group in the at least one data group, calculating a similarity sub-value between first character distribution statistical information of the first data subset and second character distribution statistical information of the second data subset; and determining a similarity value between the first data set and the second data set based on the similarity sub-value corresponding to each data group in the at least one data group.

22. The system according to claim 21, wherein the calculating the similarity sub-value between the first character distribution statistical information of the first data subset and the second character distribution statistical information of the second data subset includes:

for each length position of the first data subset and the second data subset, calculating a second KL distance between a first character distribution vector and a second character distribution vector to obtain a plurality of second KL distances;

determining a first number of second KL distances that are in the plurality of second KL distances and that are less than or equal to a second KL threshold; and calculating a first ratio between the first number and a total number of the plurality of second KL distances.

23. The system according to claim 21, wherein the determining the similarity value between the first data set and the second data set includes:

determining a similarity sub-value corresponding to one data group meeting a predetermined condition as the similarity value between the first data set and the second data set; and wherein the determining that the character distribution similarity meets the second predetermined condition includes:

determining that the similarity value is greater than a predetermined similarity threshold.

24. The system according to claim 21, wherein the determining the similarity value between the first data set and the second data set includes:

calculating the similarity value between the first data set and the second data set based on similarity sub-values corresponding to two or more data groups from the at least one data group; and wherein the determining that the character distribution similarity meets the second predetermined condition includes:

determining that the similarity value is greater than a predetermined similarity threshold.

25. The system according to claim 20, wherein the actions further comprise:

before the determining the length distribution similarity between the first data set and the second data set, determining that a length corresponding to the largest number of data samples in the first data set is the same as a length corresponding to the largest number of data samples in the second data set.

26. The system according to claim 20, wherein a language type of the data samples in the first data set and a language type of the data samples in the second data set include at least one of English, French, or Chinese, and the language type of the data samples in the first data set is the same as the language type of the data samples in the second data set.

27. The system according to claim 20, further the actions further comprise:

after the determining the data corresponding to the to-be-identified field as the private data of the same type as the first data set, anonymizing the data corresponding to the to-be-identified field.

* * * * *